Nov. 9, 1948.  W. K. ROBINSON  2,453,265
EDUCATIONAL DEVICE
Filed Jan. 29, 1948
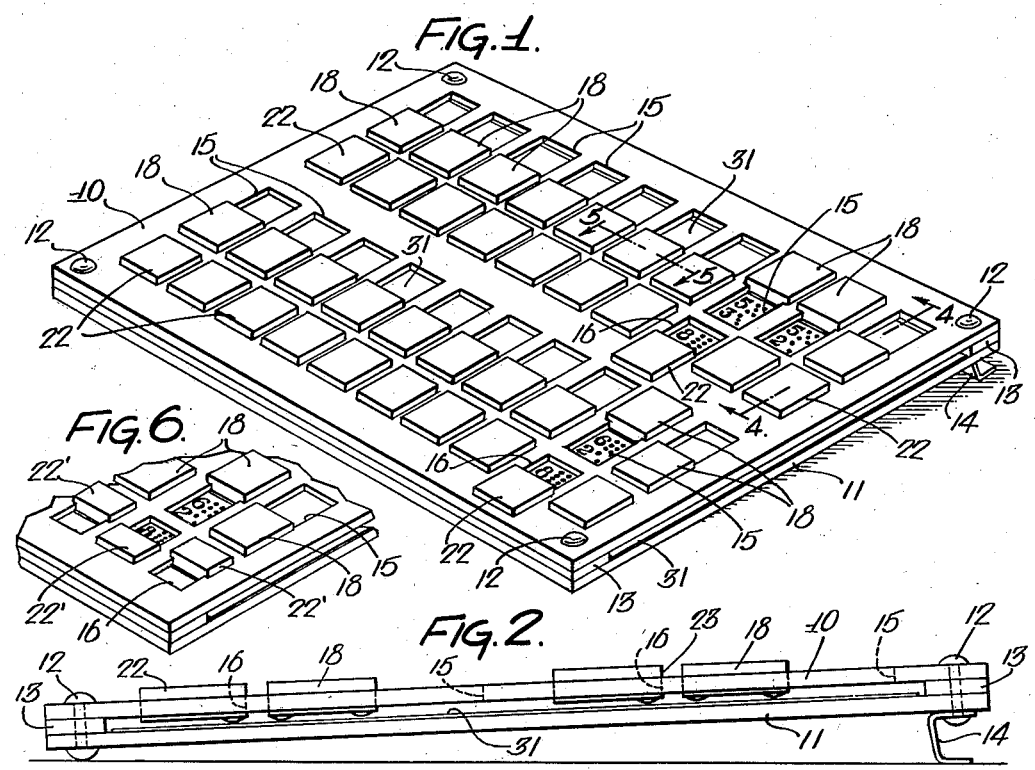
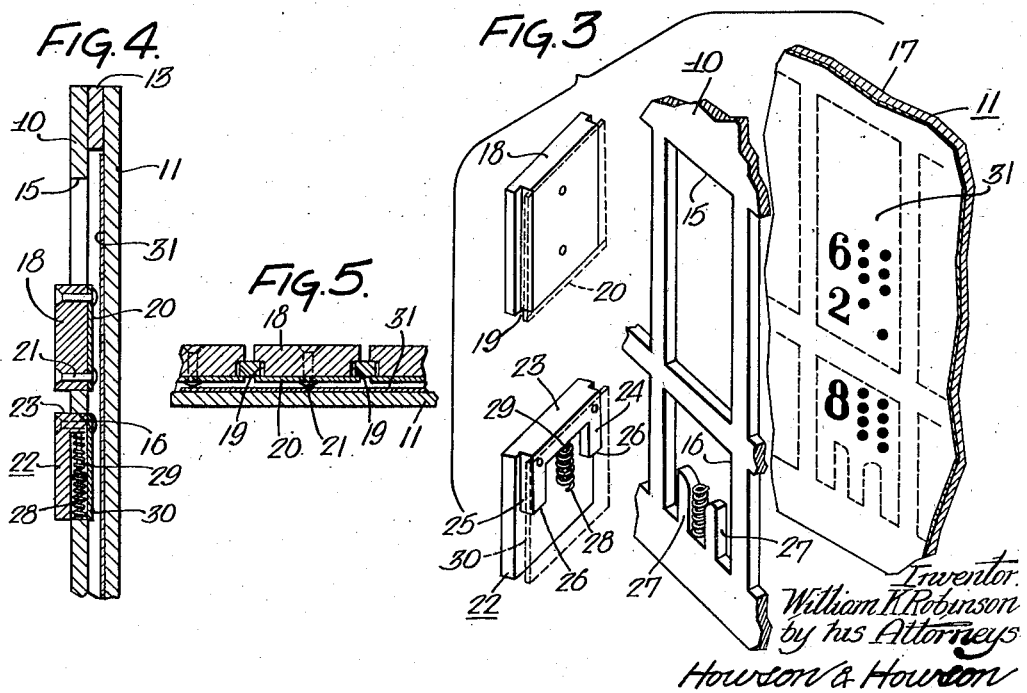
Inventor.
William K. Robinson
by his Attorneys
Howson & Howson Patented Nov. 9, 1948

2,453,265

UNITED STATES PATENT OFFICE 2,453,265

EDUCATIONAL DEVICE

William K. Robinson, Ventnor, N. J.

Application January 29, 1948, Serial No. 5,054

3 Claims. (Cl. 35—9)

This invention relates to educational devices and more particularly to a problem and answer board in which the problems as well as the answers are concealed by means of slidable blocks in windows registering with the problems and answers.

A primary object of the invention is to provide a dual frame having a superimposed top member attached in spaced relation to a bottom member so that problem cards may be inserted between the top and bottom members. A plurality of windows or openings in the top member are adapted to register with the problems on the underlying card and a second group or row of windows are adapted to register with the answers to the respective problems. Opaque blocks are slidable in the windows and serve to selectively conceal both the problems and the answers. The blocks in the problem windows however, are freely slidable therein, whereas the blocks in the answer windows are of modified construction and if desired may be spring-loaded so that the answer is visible to the child only when the block is forcibly depressed.

A further object of the invention is to provide an educational device of the type described which is inexpensive to fabricate and is especially adapted to the utilization of synthetic plastic material.

Further objects will be apparent from the specification and drawings in which:

Fig. 1 is a perspective of an educational device constructed according to the invention;

Fig. 2 is an end elevation view of the structure of Fig. 1;

Fig. 3 is an exploded view in perspective, showing in detail the window and block construction;

Fig. 4 is an enlarged sectional detail along the line 4—4 of Fig. 1;

Fig. 5 is an enlarged sectional detail along the line 5—5 of Fig. 1; and

Fig. 6 is a fragmentary perspective showing a detail of a modified form of construction for the answer blocks.

Referring now more particularly to the drawings, the device comprises a top plate or member 10 which is bolted or secured to a solid bottom member 11 by means of rivets 12, extending through spacer strips 13, 13. If desired, one edge of the bottom member 11 may be provided with legs 14 as shown in Fig. 2. Top member 10 has in the preferred embodiment two rows of rectangular windows 15 and 16. The top row of windows 15 in each set is adapted to disclose a series of problems in addition, multiplication, subtraction, etc. which appear on a problem card 17; whereas the row of windows 16 directly below windows 15, is adapted to register with the corresponding answer on the problem card.

The rectangular dimensions of problem windows 15 are such that the length of the window is approximately twice the space required for visibility of the problem, so that an opaque slidable block 18 may be positioned in each window to selectively conceal and disclose the problem. Blocks 18 are provided with grooves 19 (Fig. 5) along the lower portions of their lateral edges. A retaining plate 20 is secured to the bottom of each block after positioning in the windows and retained thereon by means of a rivet or screw 21 or any other convenient manner such as gluing.

The answer windows 16 are substantially the same width as problem windows 15 but are ordinarily somewhat shorter since the answer requires less space than the problem. In order to prevent the child from ascertaining the answer to a given problem until he has had an opportunity to see the problem itself, I provide a spring-loaded answer block 22 of sufficient length to cover the entire window 16. The upper edge portion 23 of block 22 (as seen in Fig. 3) is of greater thickness and serves as an upper limit stop or abutment for the sliding action of the block in the window. This thickened portion continues partially around the sides of the block to prevent a pair of laterally opposed guides 24 and 25, the bottom ends of which serve as lower limit stops 26, 26 approximately midway the length of the block. The bottoms of windows 16 have a pair of cooperating guides 27, 27 which extend upwardly from the base of windows 16 and in spaced relation to the sides thereof to accommodate guides 24 and 25. The upper ends of guides 27 curve inwardly and are adapted to retain a helical compression spring 28.

In assembly, the blocks 22 are installed in windows 16 from the front, whereupon spring 28 is positioned around a guiding pin or extension 29 depending from edge portion 23 of the block and abutting the bottom of the window between guides 27, 27. A backing member 30, similar to member 20 may then be glued or riveted to the guides 24 and 25, thus retaining both the block 22 and the spring permanently in position. It will be apparent that the construction of the answer blocks is such that all the pieces may be formed from a molded plastic, the only assembly operation required being to secure the backing plates 30 to the block members.

Fig. 6 illustrates a similar form of answer window which, for the purpose of some problems, may not require a spring-loaded window construction. Answer blocks 22' are identical in construction to problem blocks 18 except that they are shorter and do not conceal the entire answer window 16.

While the invention has been described in connection with problems in multiplication, addition, etc., it will be apparent that any indicia may be used on the card 17. Pictures of familiar objects 31 such as animals, articles of fruit, etc. may be printed on the cards and serve to increase interest on the part of the child. Furthermore, it will be understood that the opening through which the problem card 17 is inserted may be along any edge of the device as may be desired, and in this connection the bottom plate may be dispensed with entirely. While the invention has been shown with a plurality of windows, it will also be obvious that any number of windows may be employed, it being necessary in some cases to use no more than one problem window and one answer window.

I claim:

1. A problem board assembly comprising a flat member having a plurality of rectangular problem windows and a plurality of rectangular answer windows therein, said answer windows being in alignment with the problem windows, an opaque block slidable in each problem window, the length of the block being substantially half the length of the window, a lip along the lateral edges of each block for engaging the sides of the window, a retaining plate attached to the back of the block, an opaque cover for each answer window, the length of the cover being substantially equal to the length of the answer window, the width of the cover being greater than the width of the answer window, an abutment at one end of the cover adapted to fit within the answer window, a pair of lateral guides attached to the cover for engaging the sides of the answer window, said guides terminating in abutments substantially midway of the cover, a pair of cooperating guides formed at one end of the answer window and in spaced relation to the sides of the window, a spring positioned between the guides in the window and contacting the inside of the abutment on the cover whereby the cover is urged to close the window, a retaining plate attached to the abutment and guides on the cover whereby the cover and the spring are slidably retained in the window, and means for positioning a problem card under the flat member in registry with the windows.

2. An educational device comprising an upper member having one or more problem windows therein and one or more answer windows therein, each answer window being in alignment with a problem window, an opaque block slidable in the problem window, an opaque block slidable in the answer window, at least some of said windows being provided with spring loaded blocks to automatically close said windows, said blocks having a groove along their lateral edges, and a retaining plate attached to the back of each block for preventing removal of the block from the window.

3. An educational device comprising an upper member having one or more problem windows therein and one or more answer windows therein, each answer window being in alignment with a problem window, an opaque block slidable in the problem window, an opaque block slidable in the answer window, said blocks having a groove along their lateral edges, a retaining plate attached to the back of each block for preventing removal of the block from the window, U-shaped extensions on the reverse side of the answer blocks, said extensions forming a pair of guides adapted to slidably cooperate with the sides of the windows, a pair of extensions for one end of the window, and a spring adapted to be retained between the extensions and the U-shaped member to slide the block in the window.

WILLIAM K. ROBINSON.

REFERENCES CITED

The following references are of record in the file of this patent:

UNITED STATES PATENTS

| Number | Name | Date |
|---|---|---|
| 649,054 | Holibaugh | May 8, 1900 |
| 708,564 | Lorenzen | Sept. 8, 1902 |
| 1,023,586 | Mullins | Apr. 16, 1912 |